(12) United States Patent
Schmidt

(10) Patent No.: US 8,944,807 B2
(45) Date of Patent: Feb. 3, 2015

(54) DEVICES AND METHOD FOR DRAW BLOW MOULDING A CONTAINER AND THE CORRESPONDING USE

(75) Inventor: Joachim Schmidt, Hettlingen (CH)

(73) Assignee: Eugen Seitz AG, Wetzikon (CH)

( * ) Notice: Subject to any disclaimer, the term of this patent is extended or adjusted under 35 U.S.C. 154(b) by 61 days.

(21) Appl. No.: 12/994,512

(22) PCT Filed: Nov. 11, 2009

(86) PCT No.: PCT/CH2009/000357
§ 371 (c)(1),
(2), (4) Date: Jun. 16, 2011

(87) PCT Pub. No.: WO2010/057325
PCT Pub. Date: May 27, 2010

(65) Prior Publication Data
US 2011/0241265 A1   Oct. 6, 2011

(30) Foreign Application Priority Data

Nov. 18, 2008   (EP) .................................. 08405281

(51) Int. Cl.
| | | |
|---|---|---|
| B29C 49/00 | (2006.01) | |
| B29C 49/12 | (2006.01) | |
| B29C 49/42 | (2006.01) | |
| B29C 49/06 | (2006.01) | |
| B29C 49/48 | (2006.01) | |
| B29K 67/00 | (2006.01) | |
| B29L 31/00 | (2006.01) | |

(52) U.S. Cl.
CPC ............. *B29C 49/12* (2013.01); *B29C 49/4236* (2013.01); *B29C 49/06* (2013.01); *B29C 2049/1295* (2013.01); *B29C 2049/4869* (2013.01); *B29K 2067/00* (2013.01); *B29L 2031/7158* (2013.01)
USPC ......................................................... 425/529

(58) Field of Classification Search
USPC ........................................................ 425/529
See application file for complete search history.

(56) References Cited

FOREIGN PATENT DOCUMENTS

| | | |
|---|---|---|
| DE | 100 53 901 C1 | 6/2002 |
| DE | 103 25 229 A1 | 12/2004 |
| EP | 1 484 160 A1 | 12/2004 |
| GB | 2 358 967 A | 8/2001 |
| WO | WO 2006/108380 A | 10/2006 |

OTHER PUBLICATIONS

International Search Report issued Apr. 13, 2010 in PCT Application No. PCT/CH2009/000357.
International Preliminary Report on Patentability based on PCT/CH2009/000357 dated May 24, 2011.

*Primary Examiner* — Larry Thrower
(74) *Attorney, Agent, or Firm* — Venable LLP; Jeffri A. Kaminski

(57) ABSTRACT

The invention relates to a device (10) for blow molding a container from a parison, comprising a blowing cylinder (11) and a blowing nozzle (12) mounted thereon, in which the parison (R) can be fixed and with a stretching rod (13), enclose by the cylinder (11) and which may be passed through the nozzle (12), wherein the nozzle (12) can be supplied with compressed air via openings (14) in the cylinder (11). The station (10) is characterized in that the stretching rod (13) is driven by a single tubular electric linear motor (15) the stator (15-1) of which is mounted on the cylinder (11) and the armature (15-2) of which is connected to the stretching rod (13).

24 Claims, 5 Drawing Sheets

US 8,944,807 B2

DEVICES AND METHOD FOR DRAW BLOW MOULDING A CONTAINER AND THE CORRESPONDING USE

CROSS-REFERENCE TO RELATED APPLICATIONS

This application is a National Stage Application of PCT/CH2009/000357, filed Nov. 11, 2009, which designates the United States and claims the priority of European Patent Application No. 08405281.0, filed on Nov. 18, 2008.

BACKGROUND

1. Field of Invention

The invention relates to a device for blow molding a container, as well as to the use of a tubular electric linear motor in such a device.

2. Related Art

Such blow molding devices are used, for example, in hollow stretch blow molding machines in the case of which a parison is stretch molded by the stretching rod within a blow mold in response to a thermal conditioning and is recast by the blowing pressure impact in the container. In the case of a container forming by means of the impact of blowing pressure, parisons made of a thermoplastic material, for example parisons made of PET (polyethylene terephthalate), are supplied to different processing stations within a blow molding machine.

Typically, such a blow molding machine encompasses a plurality of blowing stations, which are arranged on a common blowing wheel, and which in each case encompass a blow molding device as well as a forming tool, in which the previously tempered parison is expanded into a container by means of biaxial orientation. A heating station for preheating the parisons is thereby typically not located on the blowing wheel itself, but in a continuous annealing furnace located upstream. Typically, the expansion of the parisons takes place by means of compressed air, which is introduced into the parison, while the stretching rod is simultaneously extended for guiding the parison.

With reference to the used blowing stations, different embodiments are known. In the case of blowing stations, which are arranged on rotating transport wheels, the mold support can often be opened in a book-like manner. However, it is also possible to use mold supports, which can be displaced relative to one another or which are guided in a different manner. In the case of stationary blowing stations, which are in particular suitable to accommodate a plurality of cavities for the container molding, disks are typically used as mold supports, which are arranged parallel to one another.

The stretching rods are hereby often positioned by pneumatic cylinders and mostly in combination with a mechanical connecting rod, whereby the blow molding devices not only reach an enormous installation height, but also require a particularly stable design due to the parts, which are difficult to move as well as due to the forces appearing in the connecting rod due to the counteraction. The already high weight of such a device is thus additionally increased and the rotary motion thereof, e.g., requires much energy in a blow molding machine. Likewise, the energy consumption is very high due to the use of compressed air as drive medium. A pneumatic/mechanic positioning of the stretching rods thus likewise increases the production and operating costs of a blow molding machine, which is designed in this manner.

It is already known from German patent document DE-OS 103 25 229 to use an electric linear drive, which is constructed similarly to the functional principle of the Transrapid railroad system, for positioning a stretching rod. Such linear motors provide for a highly accurate reproducibility when carrying out stretching motions, but encompass a comparatively high construction weight and a high price.

International patent application publication no. WO 2006/108380 tries to solve this problem by combining a fluid drive and an electric linear motor and to thus combine the advantages of the respective drive systems with one another. In the context of controls, fluid drives, in particular pneumatic or hydraulic drives, make it possible to carry out positioning motions very quickly in response to high forces, which can be generated, and in response to low construction weight. However, the fluid drives encompass disadvantages with reference to the positioning accuracy, in particular when carrying out positioning motions very quickly, because control processes can only be realized to a limited extent in consideration of the system inertias. By means of combining a fluid drive with an electric linear motor, it is to now be possible to use a linear motor with relatively low output and thus also a low price and small construction weight and to only use it to correct the acceleration or braking forces, respectively, of the fluid drive. However, an important disadvantage of this combination lies in the fact that neither the weight nor the installation size of a blow molding machine can be decreased drastically, because an electric linear motor must also be integrated in addition to the fluid drive. This solution furthermore still uses a fluid drive and thus a very expensive source of energy.

European patent document EP 1 484 160 shows a drive device, which is also embodied as a linear motor. The device is connected to an actuator, which gives an actuating variable for the linear motor as a function of a comparison between a setpoint value course and an actual value, which is determined by means of measuring techniques, for a respective positioning of the stretching rod. The setpoint value course is thereby stored in the area of a setpoint value storage. By embodying the drive device as linear motor, small spatial dimensions are to provide for a high mechanical resilience and are to be used for generating large forces, which can be metered accurately. A predetermined motion profile is to be adhered to accurately by means of the control circuit and the direct evaluation of a current actual positioning of the stretching rod, which is performed by means of measuring techniques, because the linear motor can be regulated with a high dynamics and thus with only small time delays. However, the advantage is here that only a large and heavy and thus very expensive linear motor, which is dimensioned accordingly, is able to provide the forces, which are typically provided by a fluid drive.

The state of the art thus relates consistently to rotary machines, all of which are designed mechanically and/or pneumatically. Despite all of the expected advantages, the machines provided with electric drives encompass deficiencies and have consequently never been realized. A servo motor comprising spindle or belts, respectively, is thus extensive and expensive and displays considerable wear. In turn, a linear motor as in European patent document EP 1 484 160 is flat, but also expensive and requires further components, such as linear guides, etc. A linear motor as in International patent application publication no. WO 2006/108380 is only used to regulate the travel and does not provide for the required force. It is thus supported pneumatically/hydraulically, whereby all of the disadvantages of cylinders, such as high air consumption, cylinder wear, etc., reappear.

SUMMARY

It is an object of the instant invention to overcome the disadvantages of the state of the art and to provide a device for blow molding a container from a parison, which is designed so as to be compact and which can be produced easily as well as cost-efficiently.

According to an embodiment, a connection is established between the blowing cylinder and a tubular electric linear motor, the armature of which is connected to the stretching rod and the stator of which is supported on the blowing cylinder. The blowing cylinder thereby represents that component, which docks to the bottle by means of performing a stroke, which is so far generated pneumatically and by means of which blowing air as well as the stretching rod are inserted into the bottle. The tubular electric motor combines all of the advantages of the state of the art, because it provides sufficient force, is cost-efficient and low-wear. On principle, such motors can be designed according to the Lorentz force principle as well as according to the Maxwell force principle. The difference to the flat or U-shaped linear motors is thereby that the exciter winding of the stator comprises the magnets in the rod-shaped armature in a circular (tubular) manner.

In modern servo motor technology, the use of rare earth magnets has established itself for the generation of the flux. In the case of a tubular electric linear motor, the permanent magnets, mostly neodymium magnets, rear earth magnets or others, are located in a non-magnetic steel pipe. The individual magnets, such as induction disk or ring magnets, are inserted into these precision steel pipes in an antipolar manner, so that a N-S-N-S field distribution is created on the exterior of the steel pipe. The stator consists of an iron pipe, which serves as back iron for the magnetic flux. The windings, which are typically embodied as two or three-phase windings, are located within the iron pipe. The windings themselves are attached to a winding support, which at the same time has the function of a slide bearing. In many cases, an additional guide is thus not necessary or at least the extensive orientation between armature and stator is no longer necessary. Due to the fact that magnetisms between armature and stator or the magnetic yoke, respectively, compensate radially, a much smaller bearing load is furthermore created as compared to the flat or U-shaped linear motors. As compared to simply supporting the armature on both ends of the stator, the integrated support across the entire length of the stator has the advantage that the armature can be chosen so as to be shorter and the stress to the slide bearing is considerably lower due to the large contact surface, thus resulting in a correspondingly longer life cycle. Modern industrial linear motors of this type can perform up to several billions of strokes, depending on the use. So-called Hall effect sensors, which detect the lines of magnetic flux of the magnets in the armature, are located in the center of the stator. Due to this field detection, the relative position between armature and stator can be determined by means of a so-called sine-cosine evaluation. An additional external sensor system in the form of a glass scale or of a magnetic tape is only required when extreme demands of accuracy below approx. 0.05 mm are demanded.

In modern tubular electric linear motors, a microcontroller is located in the stator next to the windings and the position sensors. It serves for a serial communication with the drive electronics, so that further relevant data, such as the temperature in different areas of the stator, motor type, serial numbers or general information belonging to a condition monitoring, for instance, can be exchanged during operation. Linear motors are driven, e.g., by controllers comprising PWM modulation and position control circuits, as they are known from rotary servo motors. However, the special topology of linear motors involves several additional functions on the controller, provided that an optimum output is to be attained.

Such controllers for linear motors are typically connected to the subordinate control (SPS, PC) by means of field bus interfaces, such as Profibus, DeviceNet, CanOpen or ETHERNET. Due to its simple and robust design, tubular electric linear motors are predestined for the use in the rough industrial environment.

From a construction point of view, this thus creates a drive element, which encompasses similarities to a pneumatic or hydraulic cylinder. In particular, the force development thereof is comparable, because all forces are oriented in effective direction and lateral forces are not created. However, compared to a pneumatic or hydraulic cylinder, such a drive element can be positioned in a considerably more accurate manner, more dynamically and more flexible and furthermore encompasses considerably reduced dimensions, while additionally having a lower weight. It furthermore operates quicker than rotary servo drives, which generate their translatory motions via a spindle drive. Compared to a pneumatic or hydraulic solution, a servo pressure, which is typically associated with high energy costs, is also no longer needed. Compared thereto, the electric energy consumption lies below half of these costs. Due to the fact that wearing parts are also no longer present, such a drive element can be operated in a particularly cost-efficient manner. The purchase costs thereof can already be amortized after one operating year by savings in the energy consumption.

In addition, a particularly simple design of a blow molding device becomes possible, because fewer and cheaper components are required and in particular because a linear guide is no longer required as compared to the pneumatic or hydraulic solution. In addition, the installation height and thus the weight of such a device are reduced considerably. Due to the fact that the end position, speed, etc. can be controlled via the controller, such a device is also extremely flexible. In the event that different bottle shapes or sizes are used, e.g., it is no longer necessary to replace or modify a complete connecting rod, mainly in the event that the stroke height of the stretching rod must be changed. Due to the fact that a connecting rod is no longer present, different speeds are also possible, without having to perform a prior retrofitting of mechanical components, such as the connecting rod. In the case of a blowing wheel, which runs more slowly because of process-related issues, a constantly quick stretching rod feed can thus also be maintained. The machine can thus supply a variable output of bottles. Due to the fact that the blow molding device also no longer requires a massive design, rotary blow molding devices are no longer subjected to high wear, which considerably increases the life cycle thereof. However, the main advantages of the reduction of mass lie in an improved dynamics, a lower energy consumption due to reduced moved masses, in cost advantages, because less material is used and in the fact that a more compact machine itself is possible; at the same time, the production thereof is cheaper in response to the newly high price of steel.

According to an embodiment of the invention, provision is made for at least one supply air flow path and/or at least one exhaust air flow path for compressed air to or from the air inlet, respectively, wherein at least one of the paths is guided through the stator and/or past the stator of the motor. A heat flow is thus attained as close as possible to the coils, which considerably increases the continuous output of the motor. This cooling effect can be increased additionally in that provision is made for at least one flow path to the water supply, which is guided through the stator and/or past the stator of the motor.

According to an embodiment, a particularly simple design of a blow molding device results when provision is made for a blowing piston, which encompasses the stretching rod and on the one end of which the blowing nozzle is arranged and the other end of which is supported in the blowing cylinder so as to be axially displaceable. Compressed air can thereby be applied to the piston through the cylinder, so as to be moved out of said cylinder. When the piston is retracted, the parison can thus be accommodated in the blowing nozzle in a particularly simple manner. In the extended state, the blowing nozzle is sealingly pressed against the hollow mold, in which the parison is finally blown into a container. For loading the blow molding device, it is thus not necessary to move it in its entirety, which considerably simplifies the storage and kinematics thereof and which reduces the height requirement thereof.

According to an embodiment, an even more compact design of the device is attained in that the blowing cylinder and the armature of the motor are molded and dimensioned such that the armature can at least partially be passed into the blowing cylinder. This provides for a further reduction of the installation height and of the weight of the device, which was already described above, which once again reinforces the advantages mentioned there. According to an embodiment, a particularly compact and yet very simple design is attained when the armature dips into the blowing cylinder as deeply as possible, that is shortly upstream of the parison or the bottle shape, respectively. According to an embodiment, an optimal shortening of the installation height of such a device is attained in particular when a stroke height of the armature lies completely within an installation height of the blowing cylinder, that is, the end thereof on the blowing nozzle side does not move out of the blowing cylinder. Such an integration of motor and cylinder provides for a particularly compact and length-shortened design of the blow molding device.

Depending on the demands of the specific application (rotary blow molding machine, linear blow molding machine, etc.), the connection between armature and stretching rod can thereby be chosen to be different. According to an embodiment, a particularly stable connection is provided, e.g., when the armature and the stretching rod are embodied in one piece. However, a stretching rod, which can be replaced easily and which is furthermore connected to the armature in a stable manner, can be provided by a connection of the armature to the stretching rod by means of screwing. For this, the armature can encompass, e.g., an axial threaded hole and the stretching rod can encompass a corresponding external thread. A particularly quick replaceability of the stretching rod can finally be made possible in that the armature and the stretching rod are only coupled to one another in axial direction, so that the stretching rod can be "unhooked" in radial direction or peripheral direction, e.g. Couplings, such as a bayonet closure, a T-groove insertion or a coupling comprising an axial and angle compensation, which provide for a particularly rapid replacement of the stretching rod, can thereby be installed between armature and stretching rod.

According to another embodiment, an alternative arrangement of the tubular electric linear motor at a distance parallel to the blowing cylinder may be provided. In terms of a kinematic change, the armature of the motor is thereby no longer moved, but the stator thereof, which in turn is connected to the stretching rod via a cantilever arm. This coupling can take place similarly to what was already described above, thus embodied in one piece, screwed or in axial direction. In particular, the parallel arrangement of the motor has the advantage that the installation height is decreased as compared to the preceding embodiments, because an armature rod does not extend upwards and the accessibility for the replacement of the stretching rod is simplified. In addition, the motor can be cooled in a particularly simple and effective manner, so that an output increase of up to 30% can be attained. In the case of this arrangement of the linear motor, provision is also made for at least one supply air flow path and/or at least one exhaust air flow path for compressed air to or from the blowing nozzle, respectively, wherein at least one of the paths is guided through the stator and/or past the stator of the motor. As already described above, a heat flow can thus be attained as close as possible to the coils, which considerably increases the continuous output of the motor. This cooling effect can also be increased herein in that provision is made for at least one flow path to the water supply, which is guided through the stator and/or past the stator of the motor.

According to an embodiment, an even more compact design of the device is attained in that the armature is embodied as part of the stretching rod. The stretching rod can be filled directly with magnets, e.g., and can act as armature in the motor. This is advantageous in particular when the magnetic force of tubular electric linear motors is further increased in the future and when the actually required process force is reduced in response to the stretching of containers by means of improved materials or thin-walled bottles, e.g., or when bottle openings and thus stretching rod diameters increase.

According to an embodiment, an even further compressed design is finally attained in that the stator of the motor is at least partially enclosed by the blowing cylinder or is embodied as integral component of the blowing cylinder, that is, that stator is completely integrated in the cylinder in the optimal case. To not even extend the blowing cylinder itself through this, provision is preferably made for the stator of the motor to at least partially be enclosed by the blowing piston or to be embodied as integral component of the blowing cylinder. This solution is advantageous in particular for bodies comprising a larger opening than a bottle neck. For containers comprising a thinner bottle neck, however, it is possible that the process forces decrease by more and more thin-walled containers. The possible forces of the linear drives can thereby be increased by stronger permanent and electromagnets. A larger heat formation can be caught by a corresponding air and/or water cooling of the stator.

For instance, according to an embodiment, it is advantageous when the armature of the motor is embodied as a hollow magnet rod, through which the cooling blowing air is guided. Through this, the motor is additionally cooled via the armature, wherein it is also possible to generally use this air flow for cooling the motor. Even if the stretching rod is embodied as hollow rod and the blowing air is guided through the armature and the stretching rod, it can also be used for the cooling of the blow mold. The PET in the forming tool, e.g., does thereby not need to be cooled so strongly. Instead, cooling blowing air is supplied from the inside via the stretching rod. In particular when the armature is embodied as integral part of the stretching rod, e.g., a particularly simple air guide is thus created for cooling a blow molded container. The blowing air can thereby be supplied via a hose connection, which is flange-mounted to the armature of the motor directly from the top, which glides into the stretching rod from there and glides out of it into the blow mold at the lower end thereof and is finally discharged beyond the blowing nozzle. Along with a coaxial escape of the blowing air at the lower end of the hollow stretching rod, provision can also be made for this stretching rod to be provided with radial outlets, via which the blowing air is guided into the blow mold.

The exhaust air in response to the blow molding of containers can thereby be branched off, e.g. upstream of a baffle comprising a pressure level of approx. 6 bar and can be guided into a buffer, that is, into a small compressed air tank, via a non-return valve, from where the exhaust air can be guided past the motor and/or via the stator thereof in a throttled manner. Along with the advantage of the motor cooling, a minimally quicker ventilation is attained through this.

A further advantage is created when, according to an embodiment, provision is made for at least one supply air flow path and at least one exhaust air flow path for compressed air to or from the nozzle, respectively, wherein at least one of the paths is guided across the motor such that it is air-cooled. In the alternative or in addition, however, provision can also be made for a flow path for the water supply, which is guided across the motor such that it is water-cooled. In a particularly simple alternative or additional solution, provision can also be made for cooling ribs for air-cooling the motor.

By means of the afore-described cooling of the stator, thus of the coil carrier motor, the output thereof can be increased such that a common, compact, tubular electric linear motor is already sufficient as sole drive for the blow molding device. Advantageously, the cooling thereby takes place by means of media, which are present on the machine anyways. In particular, the cooling air can be used as waste product for cooling in response to the venting of the bottle along with the normal service air in the machine. Typically, cooling water is also available, because the bottle mold must be cooled.

So as not to have to use motor force to compensate the stress onto the stretching rod caused by the acting blow pressure, provision is preferably made for a stop, against which the armature abuts in an upper rest position. A continuous stress of the motor can be reduced in that provision is made for an elastically resilient return element, which compensates the dead weight of moved parts, in particular of the stretching rod and/or of the armature.

To ensure that the stretching rod is guided upwards in a mechanically secure manner in the linear motor concept according to the invention, it is advantageous when the return of the stretching rod is supported by a short, temporary compressed air blast. A collision on the blowing wheel, e.g., can be avoided through this when the finished bottle is to be removed, but when the stretching rod is stuck. In the simplest case, this compressed air can stem from the blowing exhaust air, but it can also be removed specifically from the machine service air of approx. 7 bar.

A high continuous stress of the tubular electric linear motor can thereby be avoided in that the stretching rod is retracted as soon as possible after the blow molding process has ended. Even though the blow molding process itself lasts for approx. 1.6 seconds, the stretching rod may already be retracted again shortly after reaching its end position. The already mentioned stop, against which the rod then abuts in the upper rest position, can thereby serve to mount the rod against the force, which is created by the pressure acting in the bottle. This reduces the standing force stress of the motor, which must be applied against the blowing pressure in response to an extended stretching rod.

According to an embodiment, a tubular electric linear motor may be used for solely driving the stretching rod in a device for blow molding containers from a parison.

BRIEF DESCRIPTION OF THE DRAWINGS

Embodiments of the invention will be defined below in more detail with reference to the enclosed figures. The same parts or parts, which are substantially the same, are provided with the same reference numerals.

DETAILED DESCRIPTION

Figure 1:
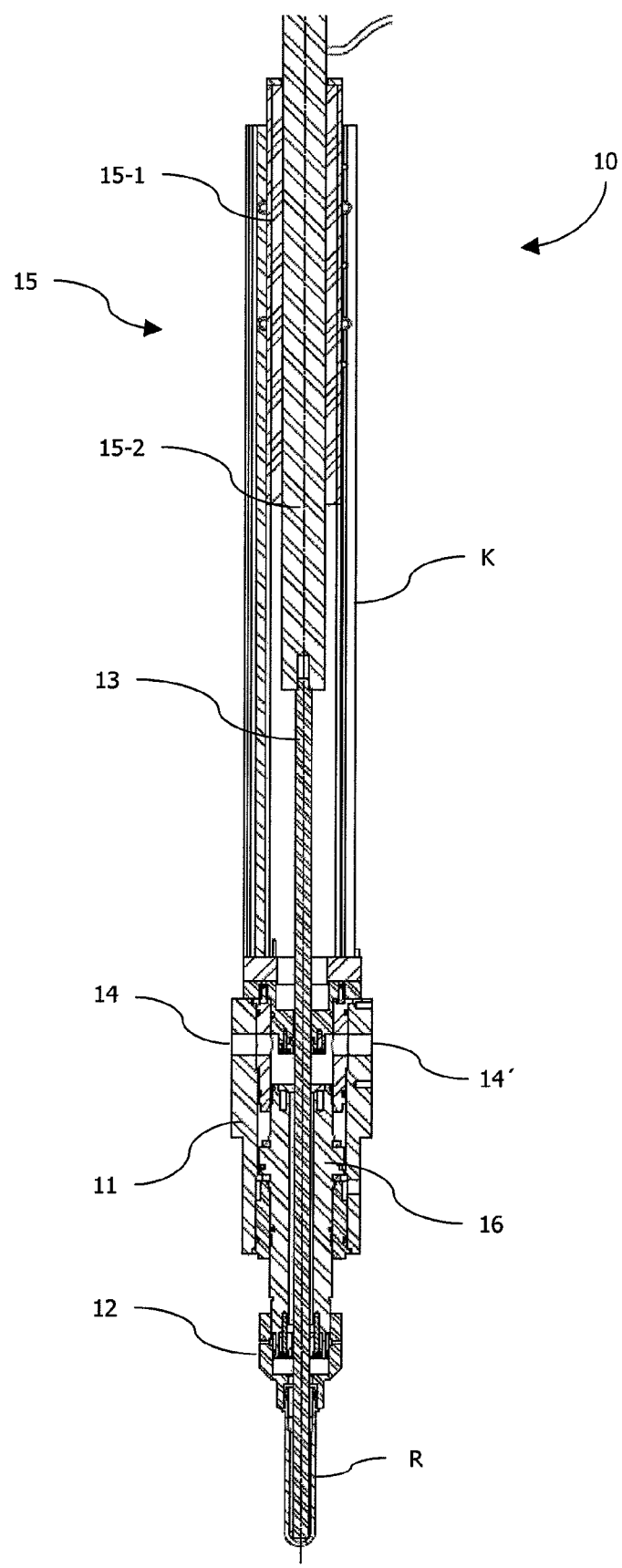
FIG. 1 shows a first compact embodiment of a device according to an embodiment of the invention for blow molding containers from parisons.

FIG. 1 shows a first compact embodiment 10 of a device according to the invention for blow molding containers from parisons R. The device 10 includes a blowing cylinder 11 and a blowing nozzle 12 mounted thereon, in which the parison R is accommodated. A stretching rod 13 can be passed through the nozzle 12 into the parison R and out of it again and is enclosed by the cylinder 11. Compressed air is supplied to the nozzle 12 via openings 14, 14' in the cylinder 11, so as to blow up the parison R simultaneously or time-delayed with the stretching process against a hollow mold (not illustrated). The stretching rod 13 is driven via a tubular electric linear motor 15, the armature 15-2 of which is screwed to the stretching rod 13. Alternative connections, however, can also provide for a quick closure or a coupling. A quick replacement of the stretching rod 13 is thus possible as a function of the container production. The stator 15-1 of the motor 15 is accommodated in a housing, which is provided with cooling ribs K. In the alternative or additionally, provision can also be made for a water cooling, which contributes to a considerable output increase of the motor 15 as do the cooling ribs K. For quickly and simply introducing the parison R, the device 10 is provided with a blowing piston 16, the one end of which is accommodated in the cylinder 11 so as to be axially movable, and the other end of which supports the nozzle 12. Prior to the actual blow molding process, the piston 16 is thereby attached to the hollow mold in an air-tight manner.

Compared to a conventional pneumatic or hydraulic blow molding device comprising a correspondingly large and heavy cylinder, the installation height of the device 10 according to an embodiment of the invention is considerably shortened by the tubular electric linear motor. Due to the fact that the design requires less and simpler components and in particular does not require a linear guide anymore, the production costs are additionally considerably lower. At the same time, the weight is reduced considerably, which generates lower inertias in particular in a blow molding machine comprising blowing stations, which rotate on a rotor. This, in turn, reduces the wear of the system and thus the operating costs thereof. While a pneumatic system, e.g., only lasts for one year, a stretch drive comprising a tubular electric linear motor is virtually wear-free. The weight-reduced system furthermore decreases the energy consumption, which contributes to a further reduction of the operating costs.

Figure 2:
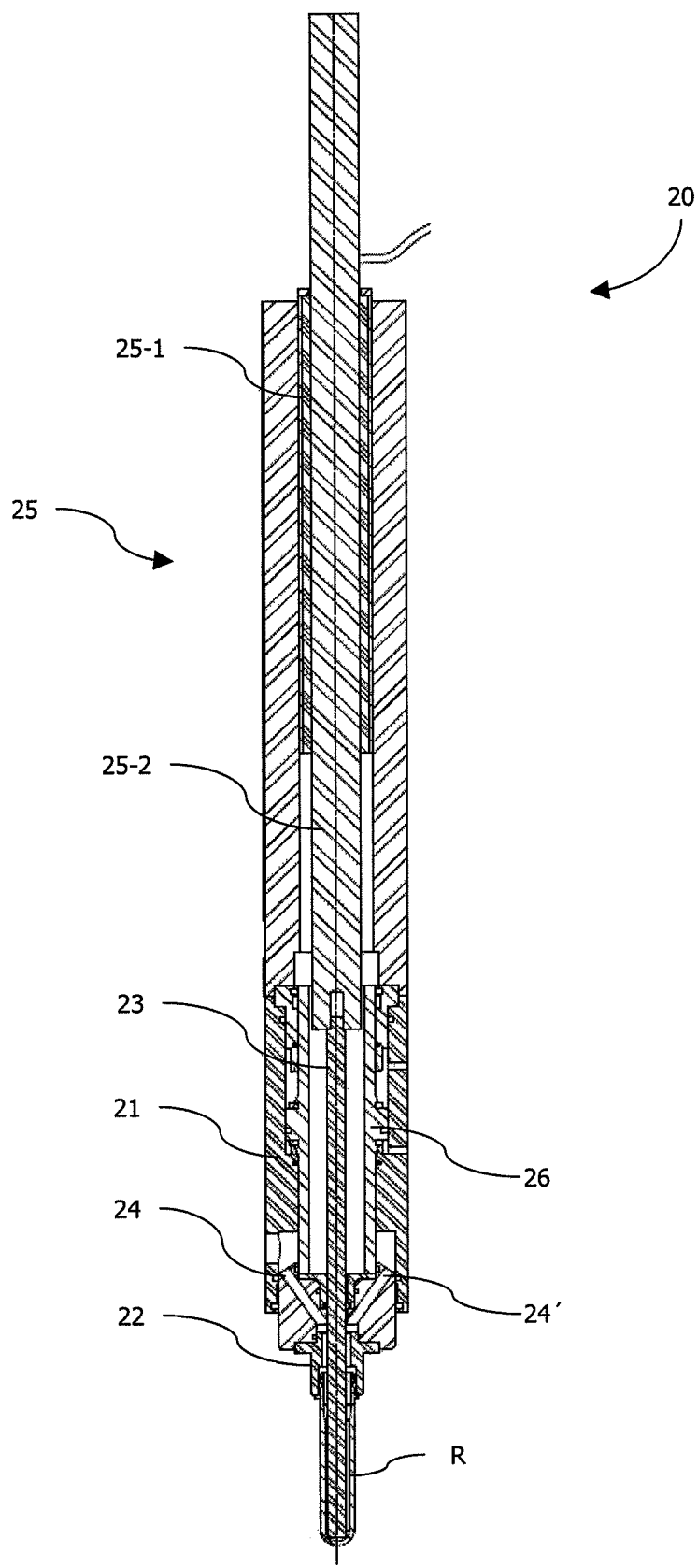
FIG. 2 shows a second, even more compact embodiment of a device according to an embodiment of the invention.

FIG. 2 shows a second, even more compact embodiment 20 of a device according to the invention. Contrary to the device 10 of FIG. 1, a blowing cylinder 21 as well as a blowing piston 26 supported therein is adapted to an armature 25-2 of a tubular electric linear motor 25 such that this armature 25-2 may be passed into the cylinder shortly in front of the parison R in one stroke movement (of approximately 400 mm). In the area of a free end, the piston 26 encompasses openings 24, 24', which converge at right angles to a nozzle 22 mounted at this end and to which compressed air is supplied via corresponding openings in the cylinder 21. Compared to the device 10, this construction allows for a further shortening of the device 20 and reinforces the advantages already mentioned therein. As is already described in FIG. 1, a stretching rod 23 is thereby screwed to the armature 25-2 of the motor 25, so as to ensure a rapid replacement as a function of the container production. As a function of the stroke height of the stretching rod 23, a stator 25-1 of the motor 25 is positioned as closely as possible on the cylinder, so as to attain an optimum of shortening. A particularly short design of the device 20 is attained when the installation height of the stretching rod 23 is located completely within the cylinder 21.

Figure 3:
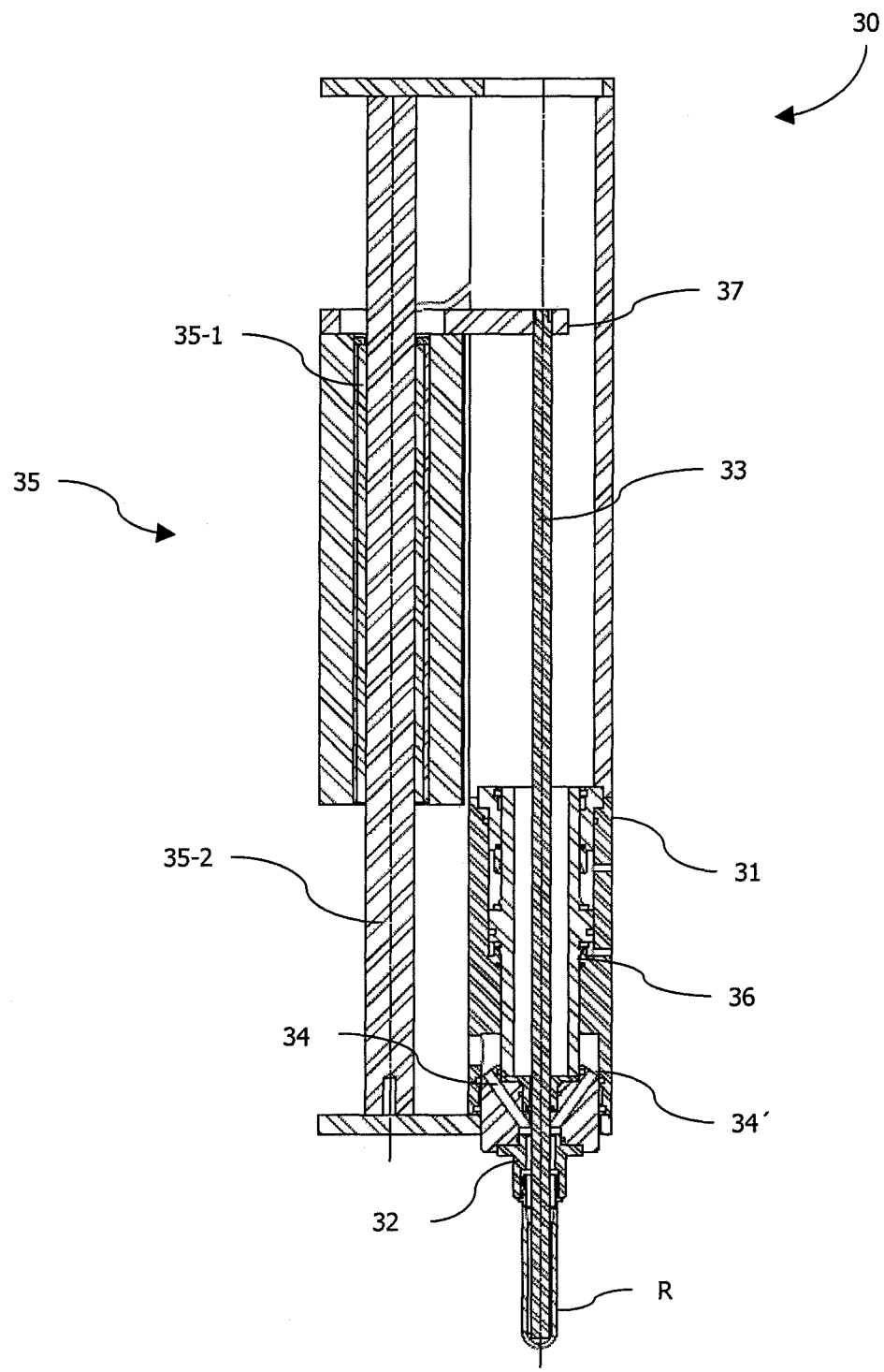
FIG. 3 shows a third, alternative embodiment of a device according to the invention according to FIG. 1 or 2, respectively.

FIG. 3 shows a third embodiment 30 of a device according to the invention, which is an alternative to FIG. 1 or 2, respectively. Contrary to the mentioned FIGS. 1 and 2, a tubular electric linear motor 35 is thereby arranged at a distance from, and parallel to, a blowing cylinder 31. In this example, the motor 35 moves along an armature 35-2 and takes along a stretching rod via a stator 35-1, with said stretching rod being connected to said stator via a cantilever arm 37. The cylinder 31, a blowing piston 36, which is located therein and which comprises openings 34, 34', and a blowing nozzle 32 mounted at the free end thereof can thereby be designed as in FIG. 2 or FIG. 1. The alternative arrangement of the motor 35 in the shown manner also considerably shortens the design of the device 30 with the already mentioned advantages.

Figure 4:
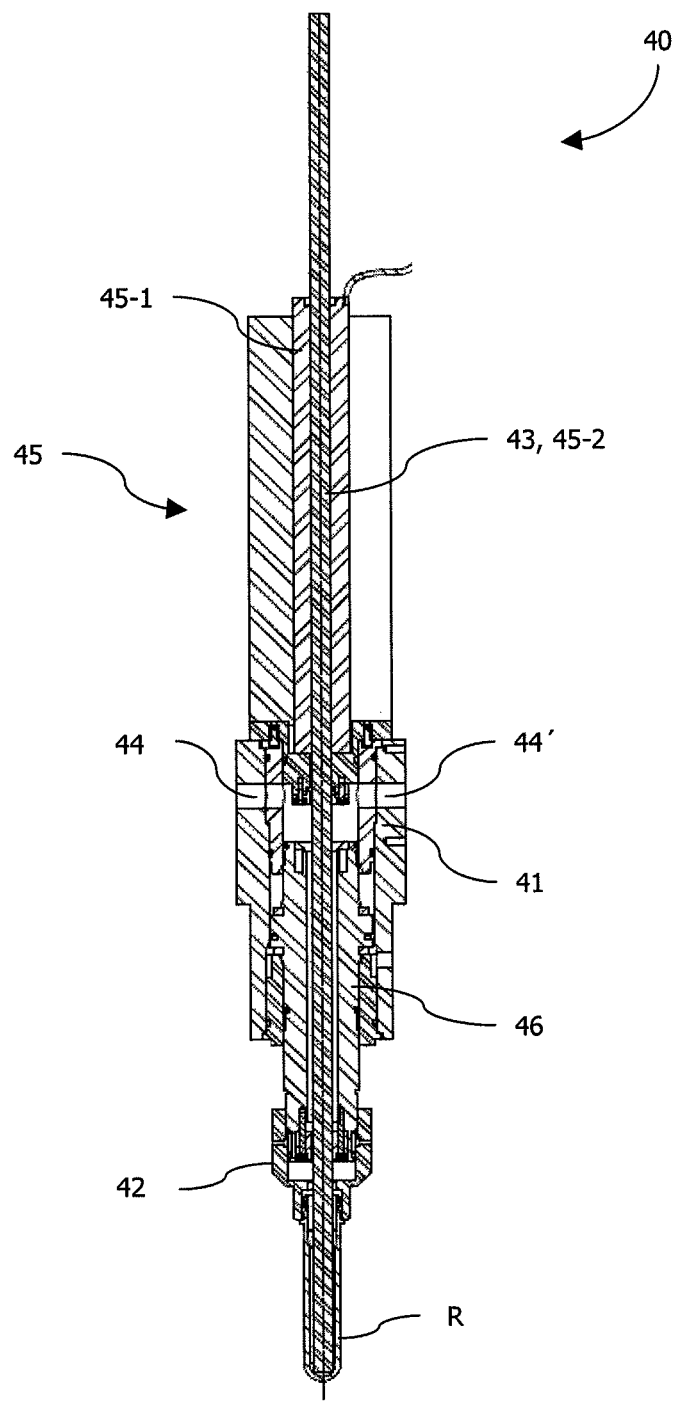
FIG. 4 shows a fourth, even more compact embodiment of a device according to the invention.

FIG. 4 shows a fourth, even more compact embodiment 40 of a device according to the invention. A further shortening of the design thereof is attained in that the armature 45-2 of a tubular electric linear motor 45 is embodied as part of a stretching rod 43. A constructive adaptation of the entire head of the device as in FIGS. 2 and 3 is thus not necessary. A blowing cylinder 41 including openings 44, 44', a blowing piston 46 and a blowing nozzle 42 can be removed from the device of FIG. 1 in an unchanged manner. The motor 45 including stator 45-1 can thus be arranged directly above the cylinder 41, because the motion of its armature 45-2, namely the stretching rod 43 herein, is not limited by the maximal depth of the cylinder 41.

Figure 5:
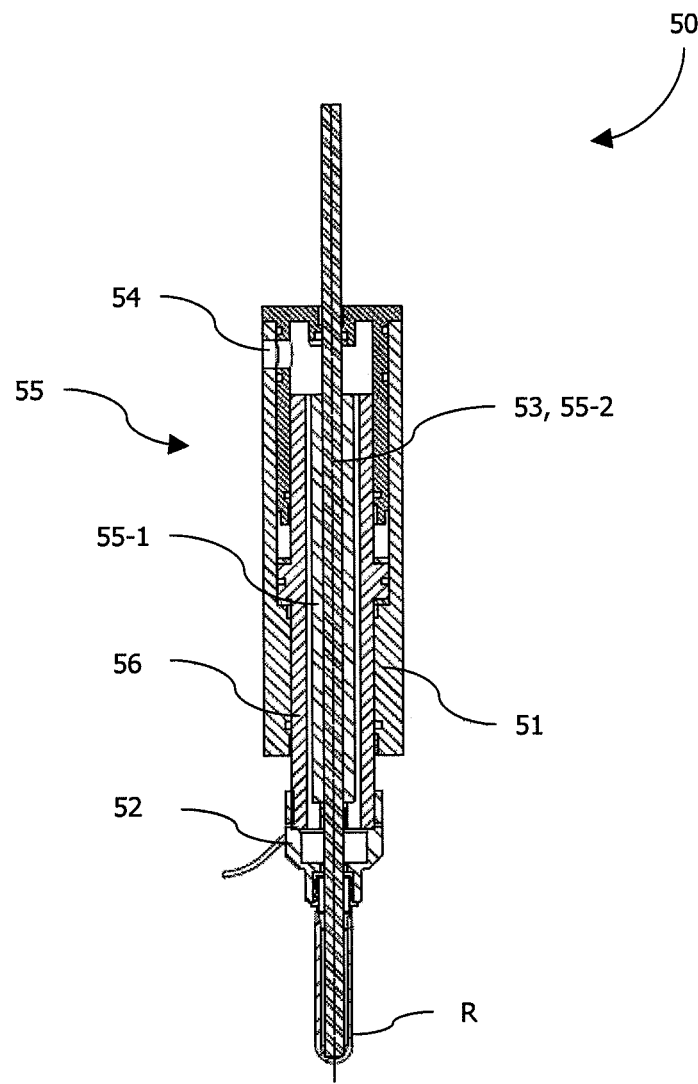
FIG. 5 shows a fifth, even further compressed embodiment of a device according to the invention.

Finally, FIG. 5 shows a fifth, even further compressed embodiment 50 of a device according to the invention. As is already shown in FIG. 4, the armature 55-2 of a tubular electric linear motor 55 is embodied as part of a stretching rod 53, thus attaining a first reduction of the installation height. In addition, the stator 55-1 of the motor 55, however, is also completely integrated in a blowing cylinder 51, which together with a blowing piston supported therein is adapted accordingly with reference to its construction. The stator 55-1 is thereby at the same time installed into the piston 56 and is moved along by it. As an alternative thereto, it is also possible, of course, for the motor 55 to be mounted by the housing in a similar installation position and for the piston 56 to move independent thereof. A blowing nozzle 52 mounted on the free end of the piston 56 is supplied with compressed air via an opening 54 in the cylinder 51.

Such an integration of the drive in the blow molding device thereby represents the most compact possible design. The simple and weight-optimized design thereof provides for low production as well as operating costs, because the energy costs are considerably reduced and because there are virtually no maintenance costs. The use of a tubular electric linear motor as drive element furthermore guarantees a high positioning accuracy in response to a simultaneous increased flexibility, both in view of different retraction lengths of the stretching rod as well as the movement speed thereof.

The invention claimed is:

1. A device for blow molding a container from a parison, comprising:
    a blowing cylinder;
    a blowing nozzle mounted on the blowing cylinder wherein the blowing nozzle is configured to accommodate the parison; and
    a stretching rod enclosed by the cylinder and arranged to pass through the nozzle, wherein the nozzle is configured to be supplied with compressed air via an opening in the cylinder, wherein the stretching rod is driven by a tubular electric linear motor, wherein a stator of the tubular electric linear motor is mounted on the cylinder, wherein an armature of the tubular electric linear motor is connected to the stretching rod, and wherein at least one flow path extends to or from the blowing nozzle and through the stator of the motor whereby air or water flowing through the flow path is in direct thermal or mechanical contact with the stator.

2. The device according to claim 1, further comprising a blowing piston enclosing the stretching rod, wherein the blowing nozzle is arranged on one end of the blowing piston, and wherein the other end of the blowing piston is supported in the blowing cylinder in an axially displaceable manner, whereby when compressed air is applied to the piston through the cylinder, the piston moves out of said cylinder.

3. The device according to claim 1, the armature at least be partially passes into the blowing cylinder.

4. The device according to claim 3, wherein a stroke height of the armature is located completely within an installation height of the blowing cylinder.

5. The device according to claim 1, wherein the armature and the stretching rod are embodied in one piece.

6. The device according to claim 1, wherein the armature and the stretching rod are screwed to one another.

7. The device according to claim 1, wherein the armature and the stretching rod are coupled to one another only in an axial direction.

8. A device for blow molding a container from a parison, comprising:
    a blowing cylinder;
    a blowing nozzle mounted on the blowing cylinder wherein the blowing nozzle is configured to accommodate a parison; and
    a stretching rod supported in the cylinder and configured to pass through the nozzle, wherein the nozzle is configured to be supplied with compressed air through the cylinder, wherein the stretching rod is driven by a tubular electric linear motor, wherein a stator of the motor is connected to the stretching rod via a cantilever arm, wherein an armature of the motor is arranged at a distance from the stretching rod and parallel to the stretching rod and is rigidly connected to the blowing cylinder, and wherein at least one air flow path for compressed air extends to or from the blowing nozzle and through the stator of the motor whereby air flowing through the air flow path is in direct thermal or mechanical context with the stator.

9. The device according to claim 1, wherein the armature is embodied as part of the stretching rod.

10. The device according to claim 9, the stator of the motor is at least partially enclosed by the blowing cylinder.

11. The device according to claim 9, the stator of the motor is at least partially enclosed by the blowing piston.

12. The device according to claim 1, wherein the armature of the motor comprises a hollow magnet rod, through which cooling blowing air is guided.

13. The device according to claim 12, wherein the stretching rod comprises a hollow rod and the cooling blowing air is guided through the armature and the stretching rod.

14. The device according to claim 1, the at least one fluid flow path comprising at least one flow path for water supply guided through the stator of the motor.

15. The device according to claim 1, the at least one fluid flow path comprising at least one supply air flow path and at least one exhaust air flow path for compressed air to or from the nozzle, respectively, wherein at least one of the paths is guided across the motor whereby the motor is air-cooled.

16. The device according to claim 1, the at least one fluid flow path comprising at least one flow path for water supply guided across the motor whereby the motor is water-cooled.

17. The device according to claim 1, further comprising cooling ribs for air-cooling the motor.

18. The device according to claim 1, further comprising a stop, against which the armature abuts in an upper rest position.

19. The device according to claim 1, further comprising an elastically resilient return element arranged to compensate for a dead weight of the stretching rod and/or of the armature.

20. The device according to claim 1, wherein the at least one fluid flow path comprises at least one supply air flow path for compressed air extending to the blowing nozzle.

21. The device according to claim 1, wherein the at least one fluid flow path comprises at least one exhaust air flow path for compressed air extending from the blowing nozzle.

22. The device according to claim 9, wherein the stator of the motor is an integral component of the blowing cylinder.

23. The device according to claim 9, wherein the stator of the motor is an integral component of the blowing piston.

24. A method of blow molding a container from a parison, comprising: utilizing the device of claim 1.

* * * * *